(12) United States Patent
Happel

(10) Patent No.: US 7,785,464 B2
(45) Date of Patent: Aug. 31, 2010

(54) FLOCCULATE DOSING TRAY

(76) Inventor: Thomas H. Happel, 5041 Scott Rd., Cocoa, FL (US) 32926

( * ) Notice: Subject to any disclaimer, the term of this patent is extended or adjusted under 35 U.S.C. 154(b) by 94 days.

(21) Appl. No.: 12/314,070

(22) Filed: Dec. 2, 2008

(65) Prior Publication Data

US 2009/0145829 A1 Jun. 11, 2009

Related U.S. Application Data

(60) Provisional application No. 61/005,513, filed on Dec. 6, 2007.

(51) Int. Cl.
*E03F 5/04* (2006.01)
(52) U.S. Cl. .................. 210/164; 210/170.03; 210/206; 404/4
(58) Field of Classification Search ................. 210/163, 210/164, 170.03, 206; 404/4, 5
See application file for complete search history.

(56) References Cited

U.S. PATENT DOCUMENTS

| 4,776,722 | A  | * | 10/1988 | Gaudin | 210/164 |
| 6,217,757 | B1 | * | 4/2001  | Fleischmann | 210/163 |
| 6,270,663 | B1 | * | 8/2001  | Happel | 210/163 |
| 6,869,525 | B1 | * | 3/2005  | Happel | 210/163 |
| 6,976,808 | B2 | * | 12/2005 | Allard | 210/163 |
| 2005/0199537 | A1 | * | 9/2005 | Kluge | 210/164 |
| 2006/0011527 | A1 | * | 1/2006 | McDermott et al. | 210/163 |
| 2008/0023408 | A1 | * | 1/2008 | Hansen | 210/164 |

\* cited by examiner

*Primary Examiner*—Christopher Upton
(74) *Attorney, Agent, or Firm*—William H. Hobby, III

(57) ABSTRACT

A flocculate dosing tray apparatus for placement in a storm water drain inlet under the inlet grate captures water entering the storm water drain inlet and dispenses a flocculate into the water for treatment of the interior storm water as the storm water enters the storm water drain system.

10 Claims, 2 Drawing Sheets

FLOCCULATE DOSING TRAY

BACKGROUND OF THE INVENTION

This application claims the benefit of U.S. Provisional Application No. 61/005,513, filed Dec. 6, 2007.

The present invention relates to a flocculate dosing tray for placement in a storm water drain inlet under the inlet grate which captures water entering the storm water drain inlet and dispensing a polymer flocculate for treatment of the entering storm water.

Storm water runoff is directed into a storm drain through a storm water drain inlet typically located in paved areas, such as streets, parking lots and the like. Storm water enters the storm water drain inlet in the storm drain where it is passed through the drain and out an outfall into a retention area, such as a retention pond or a lake or pond or the like.

In the past, it has been common to place polymer dosing materials into the storm drain through the storm water drain inlets on the floor beneath the inlet. These flocculate releasing logs add a flocculate to the water passing through the drain resulting in gradual degradation of the log as more and more water passes through the drain to provide an uneven treatment of the water passing therethrough. For instance, water that is not flowing through the drain tends to accumulate on the floor and in eddies within the drain which makes for an uneven treatment of the water and also a faster degradation of the flocculate logs. It is thus desirable to provide a way for providing more uniform and even treatment of the storm water entering the inlet in the dispensing of the flocculate for treatment of the water and to prevent the uneven treatment of water in the storm drain and the more rapid degradation of the storm water flocculate.

The present invention is directed towards a system for evenly dispensing flocculate for the treatment of storm water to prevent the uneven treatment and faster degradation that occurs in current practice.

SUMMARY OF THE INVENTION

A flocculate dosing tray for a storm drain inlet has a tray having a bottom having an opening therethrough and having a sidewall having a flanged peripheral edge. The dosing tray is sized to fit into a storm drain inlet under the inlet grate and is supported therein by the flanged peripheral edge. The tray has an interior wall extending around the opening in the tray bottom to form a channel between the tray side and the interior wall for collecting storm water entering a storm water drain inlet. The tray has a flocculate supporting platform removably supporting flocculate material thereon for receiving storm water from the tray channel and dosing the storm water with a flocculate material. The platform has a spillway for the passage of the storm water therefrom through the opening in the tray bottom and into the storm water drain system. The storm water entering the flocculate dosing tray is captured in the tray channel and directed onto the flocculate supporting platform and onto the flocculate material prior to being fed over the spillway into the storm drain. The flocculate supporting platform may also have sidewalls having screened outlets therethrough and has a removable cover thereover to protect the flocculate material from the ultraviolet rays in the sunlight. The removable cover may have slots therein, such as L-shaped slots, for connecting to pins protruding from the interior wall of the tray. The flocculate supporting platform may also have a plurality of spikes extending from the body for engaging the flocculate material, which spikes may be attached to holding feet on the bottom of the platform. The interior wall of the flocculate dosing tray has a weir therein for directing the storm water entering into the tray channel onto the flocculate supporting platform and flocculate material.

BRIEF DESCRIPTION OF THE DRAWINGS

Other objects, features, and advantages of the present invention will be apparent from the written description and the drawings in which.

DESCRIPTION OF THE PREFERRED EMBODIMENT

The present invention is a polymer dosing tray for storm water treatment which is inserted into a storm water drain inlet for the purpose of dispensing flocculate for treatment of storm water. As water enters the storm water catch basin inlet, the collecting tray directs the water flow towards a polymer flocculate material, such as a flocculate log, and passes over the flocculate log for treating the entering storm water with a polymer flocculate.

Figure 1:
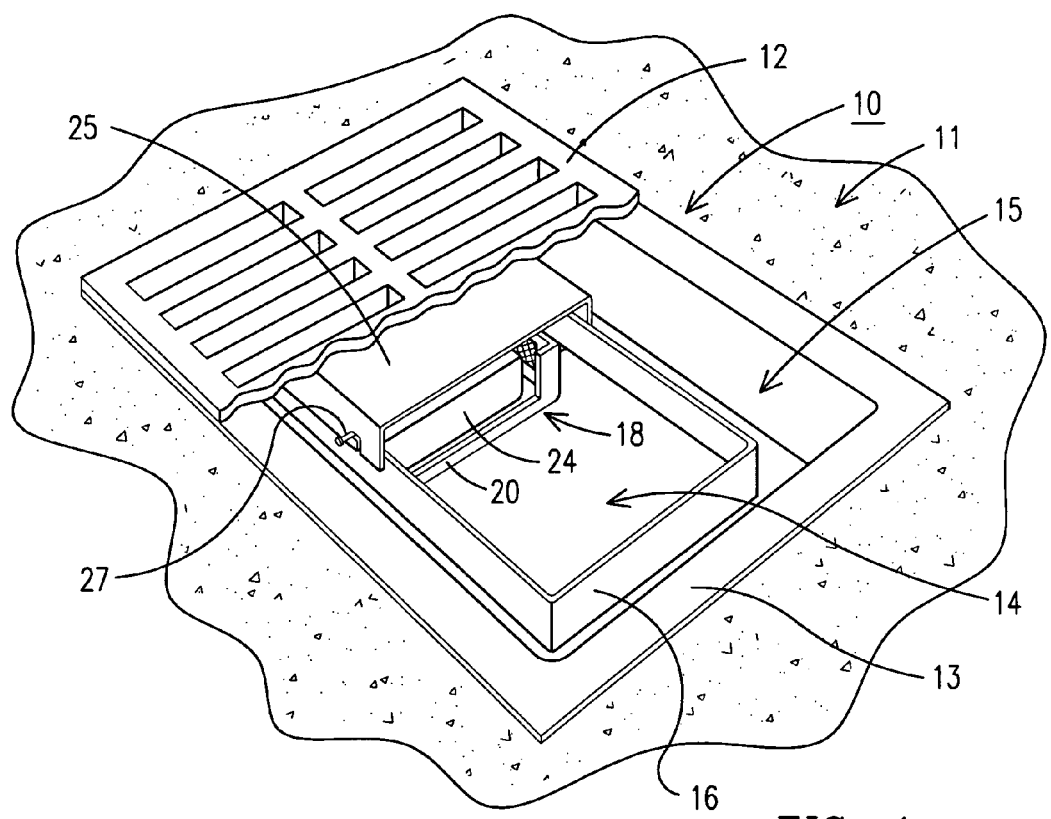
FIG. 1 is a cutaway perspective view of a polymer dosing tray in place beneath a storm water drain inlet grate.
Figure 2:
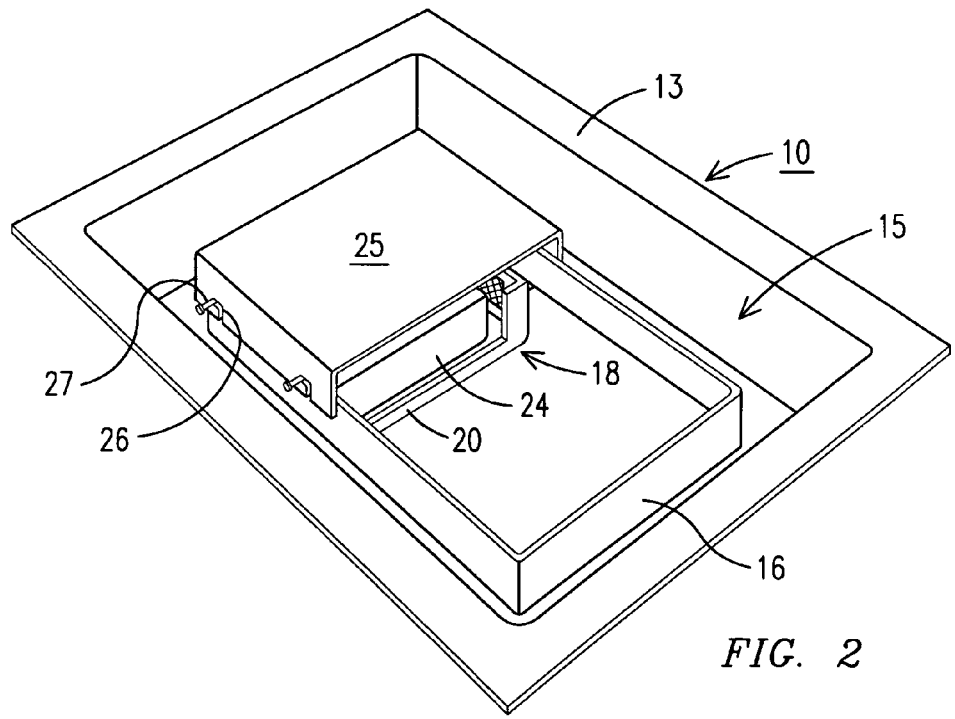
FIG. 2 is a perspective view of a polymer dosing tray.
Figure 3:
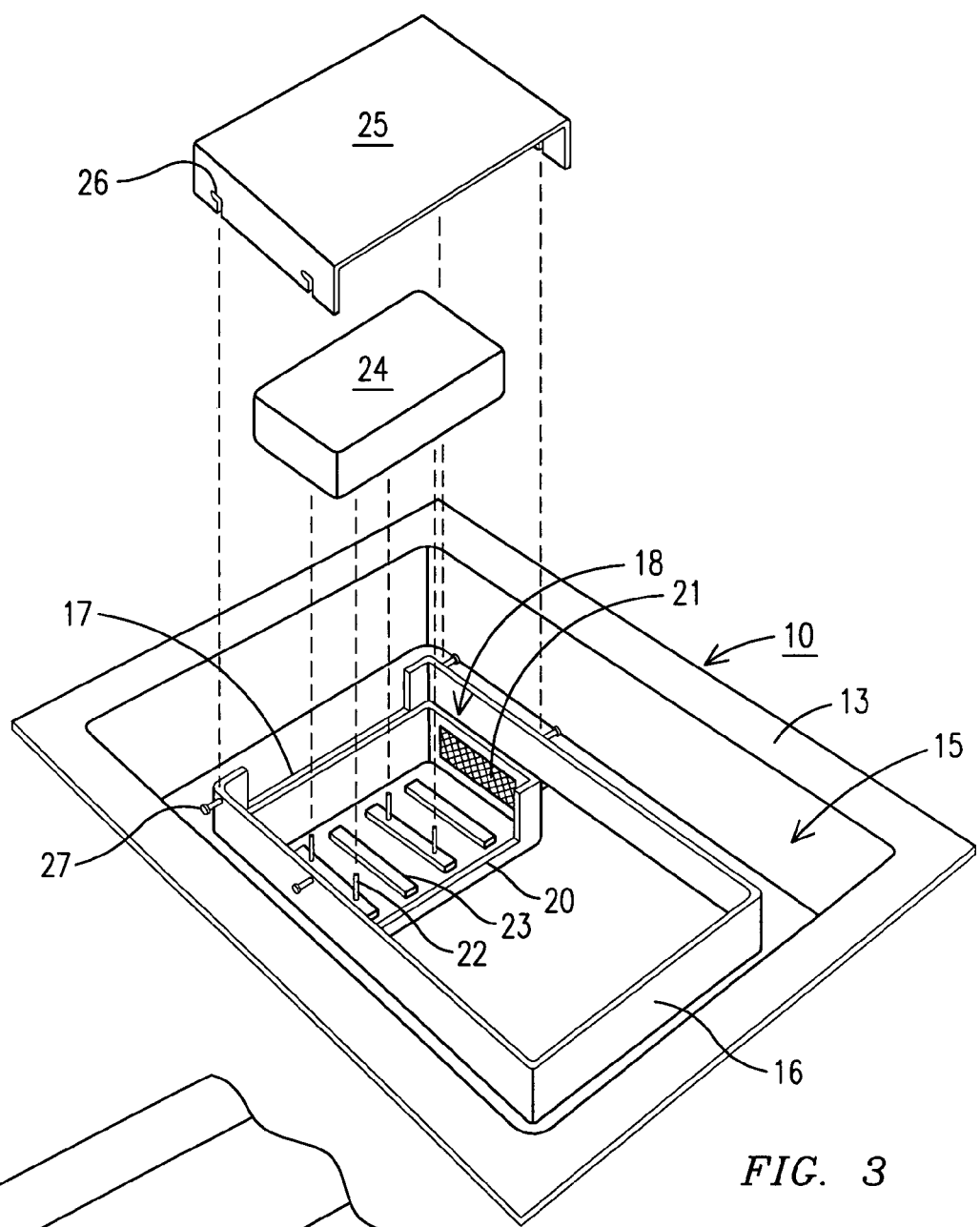
FIG. 3 is an exploded view of the polymer dosing tray of FIGS. 1 and 2.
Figure 4:
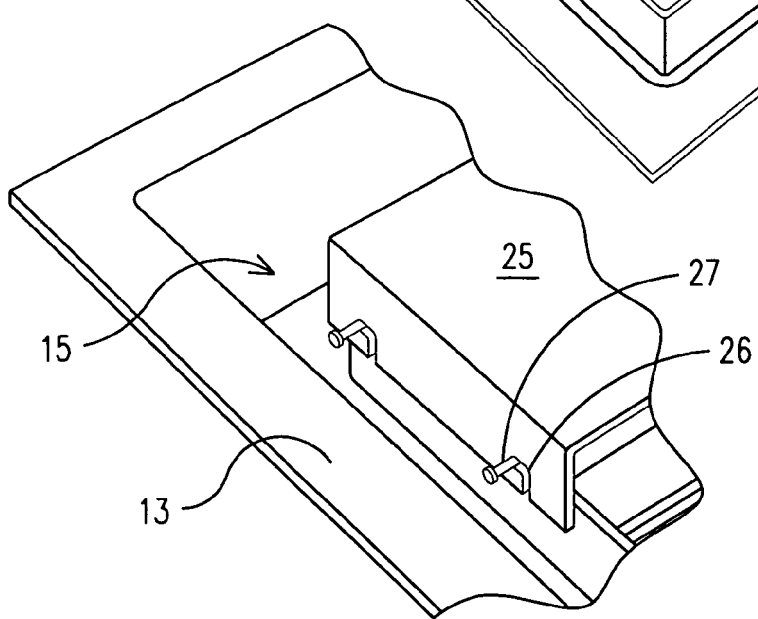
FIG. 4 is a cut away perspective of one corner of the polymer dosing tray.

Turning now to FIGS. 1 through 4 of the drawings, a storm water polymer dosing tray 10 is positioned in a storm water drain inlet located in a paved surface 11 underneath the storm water inlet grate 12. The storm water dosing tray 10 may be a fiberglass tray but can be made of any materials desired and is formed with a flange 13 that supports the tray on the pavement 11 in the storm water drain inlet. The tray 10 has an open center area 14 and a water channel 15 formed around the opening, which channel is formed with a water channel wall 16.

The water channel has a spillway or weir 17 at one end thereof to channel the water entering the water channel around the tray 10 through the spillway 17. Spillway 20 empties the storm water into a polymer dosing tray 18. The polymer dosing tray has a spillway 20 at the other end away from the spillway 17 and also has outlet screened areas 21 on the sides thereof to allow storm water entering the dosing tray 18 to fall into the storm drain opening through the dosing tray center opening 14 or through the screens 21. The dosing tray 18 has a plurality of spikes 22 extending upward from the bottom and which are held in place by spike holding feet 23. Spike 22 allows a flocculate log 24 to be inserted into the dosing tray 18 and held there by the spikes 22. The dosing log 24 can be a polyacrylamide applicator log which releases a polymer flocculate into the water passing through the polymer dosing tray 10.

Water enters the dosing tray 10 into the storm water channel 15 and passes over the spillway 17 into the dosing tray 18. The water passes over the flocculate log 24 and into the storm drain. The flocculate holding dosing tray 18 has a UV cover to protect the flocculate log 24 from the ultraviolet from sunlight. The UV cover 25 has a plurality of L-shaped slots 26 which allow the cover to be rapidly attached to the pins 27 on the sides of the dosing log tray 18. This allows the rapid changing of the dosing log 24 by moving the storm water drain inlet grate 12 and quickly removing the UV cover 25 to replace a dosing log 24 in the dosing log tray 18. The dosing log may also be wrapped with a cord for holding dosing logs together for the rapid insertion or removal from the dosing log tray 18. The dosing log is a polyacrylamide applicator log for dispersing flocculate in water passing thereover.

The present invention, as illustrated in FIGS. 1 through 4, advantageously allows the storm water entering-the storm water inlet to be channeled through a spillway into a dosing log tray. Water passing on and around the dosing log 24 will provide a generally uniform and even distribution of the polymer flocculate into the water passing thereon. This makes for a longer lasting polymer flocculate dispensing log while providing a uniform treatment of the storm water. If a rope wraps the log, it can be cut off of the flocculate log or wrapped around the log but for larger inlets, multiple logs will likely be used which can be attached together with a rope.

It should be clear at this time that a polymer dosing tray has been provided that may be a fiberglass tray for insertion into a storm water drain inlet for dispensing flocculate into the storm water for treatment of the storm water. As water enters, the storm water catch basin tray directs the water flow towards the polymer flocculate log and, as the water passes over the flocculate log, it is treated with the polymer formed in the log.

However, the present invention is not to be construed as limited to the forms shown which are to be considered illustrated rather than restrictive.

I claim:

1. A flocculate dosing tray for a storm drain inlet comprising:

a tray having a bottom having an opening therethrough and having a side wall having a flanged peripheral edge, said tray being sized to fit into a storm drain inlet and supported therein by said flanged peripheral edge, and said tray having an interior wall extending around at least a portion of the opening in said tray bottom to form a channel between said tray side and said interior wall for collecting storm water entering a storm drain inlet; and said tray having a flocculate supporting platform removably supporting flocculate material thereon, said flocculate supporting platform being positioned to receive storm water from said tray channel, said platform having a spillway for the passage of storm water therefrom through said opening in said tray bottom;

whereby storm water entering said flocculate dosing tray is captured in said tray channel and directed onto said flocculate supporting platform and onto said flocculate material thereon and over said spillway and into said storm drain.

2. The flocculate dosing tray for a storm drain inlet in accordance with claim 1 in which said flocculate supporting platform has a cover thereover.

3. The flocculate dosing tray for a storm drain inlet in accordance with claim 2 in which said flocculate supporting tray has a side wall having a screened outlet therethrough.

4. The flocculate dosing tray for a storm drain inlet in accordance with claim 3 in which said flocculate supporting platform has a plurality of spikes extending from the bottom thereof.

5. The flocculate dosing tray for a storm drain inlet in accordance with claim 4 in which said flocculate supporting platform has plurality of spike holding feet on the bottom thereof.

6. The flocculate dosing tray for a storm drain inlet in accordance with claim 2 in which said tray interior wall has a plurality of pins extending from the side wall thereof.

7. The flocculate dosing tray for a storm drain inlet in accordance with claim 6 in which said cover has a plurality of slots therein aligned to engage said pins extending from said tray interior wall for holding said cover over said flocculate supporting platform.

8. The flocculate dosing tray for a storm drain inlet in accordance with claim 6 in which said cover has a plurality of generally L-shaped slots therein to engage said pins extending from said tray interior wall for holding said cover over said flocculate supporting platform.

9. The flocculate dosing tray for a storm drain inlet in accordance with claim 1 in which said interior wall has a weir therein for directing storm water entering said channel onto said flocculate supporting platform and flocculate material thereon.

10. The flocculate dosing tray for a storm drain inlet in accordance with claim 9 in which the flocculate material is a polymer flocculate log.

* * * * *